United States Patent
Yokosuka et al.

(10) Patent No.: US 7,085,250 B2
(45) Date of Patent: Aug. 1, 2006

(54) INFORMATION-TRANSMISSION SYSTEM WHICH USES NON-GEOSYNCHRONOUS ARTIFICIAL SATELLITES, INCLUDING SERVER-SYSTEM AND ITS CLIENTS, FOR PERFORMING COMMUNICATIONS OR BROADCAST

(75) Inventors: Yasushi Yokosuka, Hitachinaka (JP); Hideki Inoue, Hitachi (JP); Toru Yamada, Yokohama (JP); Takanori Yamasaki, Yokohama (JP); Kimiya Yamaashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 840 days.

(21) Appl. No.: 09/828,194

(22) Filed: Apr. 9, 2001

(65) Prior Publication Data

US 2001/0036162 A1    Nov. 1, 2001

(30) Foreign Application Priority Data

Apr. 28, 2000  (JP) .............................. 2000-129074

(51) Int. Cl.
*H04Q 7/00*   (2006.01)
*H04Q 7/20*   (2006.01)

(52) U.S. Cl. ...................... 370/331; 370/316; 455/436; 455/442

(58) Field of Classification Search ................ 370/316, 370/322, 326, 328, 329, 330, 331, 332, 333, 370/334; 455/431, 427, 428, 430, 436, 440, 455/442, 12.1

See application file for complete search history.

(56) References Cited

U.S. PATENT DOCUMENTS

| | | | | |
|---|---|---|---|---|
| 5,483,664 A * | 1/1996 | Moritz et al. | ................ | 455/428 |
| 5,894,590 A * | 4/1999 | Vatt et al. | ................ | 455/12.1 |
| 6,128,488 A * | 10/2000 | Sauvageot et al. | .......... | 455/428 |
| 6,321,088 B1 * | 11/2001 | Dempo | ........................ | 455/436 |
| 6,333,924 B1 * | 12/2001 | Porcelli et al. | ............. | 370/331 |
| 6,603,972 B1 * | 8/2003 | Sawyer | ........................ | 455/442 |
| 6,662,011 B1 * | 12/2003 | Sale et al. | ................... | 455/428 |

* cited by examiner

*Primary Examiner*—Afsar Qureshi
(74) *Attorney, Agent, or Firm*—Antonelli, Terry, Stout and Kraus, LLP.

(57) ABSTRACT

An information-transmission system which uses non-geosynchronous artificial satellites, including a server-system and its client apparatuses, for performing communications or broadcast, the system comprises: a means for controlling changeover of a non-geosynchronous artificial satellite being used, to another satellite to be next used; wherein the server-system determines whether or not a satellite-changeover occurs during sending of an information packet to be sent toward a satellite being used, one of the non-geosynchronous artificial satellites; and if it is determined that a satellite-changeover occurs during sending of the information packet to be sent, the server-system or each client apparatus postpones sending of the information packet to be sent, and starts sending of the information packet to be sent, after the completion of the satellite-changeover; or repeatedly sends the information packet to be sent, until the completion of said satellite-changeover. Moreover, the server-system informs each satellite on at least one of the start time of, the time necessary for, and the end time of the satellite-changeover.

6 Claims, 10 Drawing Sheets

(INFORMATION PACKETS SENT BEFORE AND AFTER THE SATELLITE-CHANGEOVER)

INFORMATION-TRANSMISSION SYSTEM WHICH USES NON-GEOSYNCHRONOUS ARTIFICIAL SATELLITES, INCLUDING SERVER-SYSTEM AND ITS CLIENTS, FOR PERFORMING COMMUNICATIONS OR BROADCAST

BACKGROUND OF THE INVENTION

The present invention relates to an information-transmission system for performing communications or broadcast via non-geosynchronous artificial satellites.

There are currently many systems using a geosynchronous artificial satellite in the communications or broadcast field. A method using one geosynchronous artificial satellite has an advantage in that it is possible to continuously serve a specific district on the earth with one artificial satellite. In this method, the artificial satellite can be seen in a fixed direction from the district, and therefore, seen only if a receiver on the earth orients an antenna in the fixed direction toward the artificial satellite. In the communications field also, mobile communication apparatuses have come into practical use, and when a communication is carried out by a mobile communication apparatus, the mobile communication apparatus can receive the communication service by adjusting the direction of its antenna toward the geosynchronous artificial satellite.

On the other hand, a communication service which uses non-geosynchronous artificial satellites, has been now offered. In this communication service, when a mobile communication apparatus initiates its communication, a non-geosynchronous artificial satellite, which is located at the most suitable position for the communication, is selected. Further, an optimally selected satellite may change during the communication due to the movement of the mobile communication apparatus or that of the artificial satellite used for the communication. Accordingly, in the communication service which uses non-geosynchronous artificial satellites, the artificial satellite being used is changed over to another artificial satellite, and in this switching, a handover process is performed in order to maintain the quality of the communication.

In the communication or broadcast service, low orbit-, elliptical orbit-, or figure-eight orbit-artificial satellites are used, and since they move in their own predetermined orbits, they do not stop at positions relative to points on the earth. If a continuous communication or broadcast service is offered, a plurality of artificial satellites are launched, and they are spaced and moved in the same orbit in predetermined time intervals. Then, while the satellite whose position is optimal for the communication is selected, the communication or broadcast service will be continuous. In the above communication or broadcast service system, the surface of the earth would be served by a plurality of artificial satellites, with the optimal artificial satellite for the communication being selected from among a plurality of candidates.

Moreover, another non-geosynchronous artificial satellite communication or broadcast system, which is used for a specific region on the surface of earth, is possible, in which a plurality of artificial satellites is arranged on a plurality of orbits so that at least one satellite always exists at a position suitable for the communication or broadcast of the specific region, and by switching the satellites in order, the communication or broadcast is continued. In the system, which uses a geosynchronous artificial satellite, since the satellite stops at a position in midair over the equator, an elevation angle toward the satellite is smaller as the latitude of the place, at which signals are received from the satellite, becomes larger. Accordingly, in the regions of high latitude on the surface of earth, for example, Japan, if a geosynchronous artificial satellite system is used, the elevation angle toward the satellite is small. Thus, a problem occurs in which, if a receiving apparatus is a mobile device, the radio wave sent from the satellite is shielded by buildings, mountains, etc., during movement of the receiving apparatus. This has been a severe defect in a system which uses a geosynchronous artificial satellite. Therefore, weight has recently been attached to the above-described system which uses non-geosynchronous system. Although a plurality of satellites is necessary in a system which uses non-geosynchronous artificial satellites, the region which can receive the communication or broadcast service from an artificial satellite communication system, can be greatly extended, and communication or broadcast systems, which use the above-described elliptical orbit- or figure-eight orbit-artificial satellites, have been devised. If the communication or broadcast system, which covers all over the land of Japan, is realized with the above non-geosynchronous artificial satellites, it is calculated that a large elevation angle of about 70 deg. can be always ensured by appropriately arranging three satellites on the orbits so that they round on their orbits with the time interval of 8 hours, and are used in order. However, such a communication system has not been put to practical use, and subjects for practical use of this system must be reviewed.

Meanwhile, communication systems, which switch the use of artificial satellites in order, are disclosed, for example, in Japanese Application Laid-Open Hei 11-034996 and Japanese Application Laid-Open Hei 1-272235.

In a communication or broadcast system, which uses artificial satellites arranged on the non-geosynchronous orbits, such as elliptical orbit- or figure-eight orbit-artificial satellites, if the system is designed so that a single satellite is used for a region which receives the service from the system, the artificial satellites, to be used, are switched in order. The inventors have realized that troubles in the communication or broadcast tend to occur in that switching of the satellites, and these troubles must be prevented in order to put the above system to practical use. Various kinds of troubles can be assumed. For example, there is the hazard in that a large quantity of radio wave packets may be invalidated. It has become clear that the switching of the satellites may cause a deterioration in reliability of the system, to the user.

SUMMARY OF THE INVENTION

An objective of the present invention is a highly reliable information-transmission system including a server-system and its client apparatus, for performing communications or broadcast, using non-geosynchronous artificial satellites.

To achieve the above objective, the present invention provides an information-transmission system which uses non-geosynchronous artificial satellites, including a server-system and its clients apparatuses, for performing communications or broadcast, the system comprising: a means for controlling changeover of a non-geosynchronous artificial satellite being used, to another satellite to be next used; wherein the server-system determines whether or not a satellite-changeover occurs during sending of an information packet to be sent toward a satellite being used, of the non-geosynchronous artificial satellites, and if it is determined that a satellite-changeover occurs during sending of the information packet to be sent, the server-system postpones sending of the information packet to be sent, and starts sending of the information packet to be sent, after completion of the satellite-changeover.

Also, the present invention provides an information-transmission system which uses non-geosynchronous artificial satellites, including a server-system and its clients apparatuses, for performing communications or broadcast, the system comprising: a means for controlling changeover of a non-geosynchronous artificial satellite being used, to another satellite to be next used; wherein the server-system determines whether or not a satellite-changeover occurs during sending of an information packet to be sent toward a satellite being used, of the non-geosynchronous artificial satellites, and if it is determined that a satellite-changeover occurs during sending of the information packet to be sent, the server-system repeatedly sends the information packet to be sent, until completion of the satellite-changeover.

In the above information-transmission system, the server-system informs each satellite of at least one of the start time of, the time necessary for, and the end time of the satellite-changeover.

Further, in the above information-transmission system, if it is determined that a satellite-changeover occurs during sending of an information packet to be sent, each client postpones sending of the information packet to be sent, and restarts sending of the information packet to be sent, after the completion of the satellite-changeover.

Furthermore, in the above information-transmission system, each client apparatus sends the information packet to be sent, whose sending has been postponed, after the completion of the satellite-changeover, along with the last m items of information packets which were sent before the satellite-changeover, and are inserted and sent before the information packet to be sent; where m indicate an integer not less than 0.

Also, in the above information-transmission system, the start time of sending the information packet to be sent, after the completion of the satellite-changeover, is set to a random time.

Moreover, in the above information-transmission system, if it is determined that a satellite-changeover occurs during sending of an information packet to be sent, each client repeatedly sends the information packet to be sent, until the completion of the satellite-changeover.

Further, in the above information-transmission system, the server-system informs each client apparatus that the satellite-changeover is in operation.

Furthermore, in the above information-transmission system, each client apparatus displays that the satellite-changeover is in operation, on its display device.

Still further, in the above information-transmission system, a data region in which at least one of the start time of the satellite-changeover, the time necessary for, and the end time of the satellite-changeover is set, is provided in an information packet which is sent from the server-system to each client apparatus.

In the above information-transmission system, the means for controlling changeover of a non-geosynchronous artificial satellite being used to another satellite to be next used, is provided in the server-system.

Further, in the above information-transmission system, the means for controlling changeover of a non-geosynchronous artificial satellite being used, to another satellite to be next used, is provided in at least one of the satellites.

In addition, the present invention provides a method of sending an information packet which is going to be sent during a period which includes the time of satellite-changeover; used for an information-transmission system which uses non-geosynchronous artificial satellites, including a server-system and its clients apparatuses, for performing communications or broadcast; the method comprising the steps of: taking in the time of satellite-changeover which is going to be performed; determining whether or not the satellite-changeover will occur during sending of an information packet to be sent; send the information packet if it is determined that the satellite-changeover will not occur during sending of the information packet; and postponing sending of the information packet until completion of the satellite-changeover if it is determined that the satellite-changeover will occur during sending of the information packet.

Also, the present invention provides a method of sending an information packet which is going to be sent during a period which includes the time of satellite-changeover; used for an information-transmission system which uses non-geosynchronous artificial satellites, including a server-system and its clients apparatuses, for performing communications or broadcast; the method comprising the steps of: taking in the time of satellite-changeover which is going to be performed; determining whether or not the satellite-changeover will occur during sending of an information packet to be sent; send the information packet if it is determined that the satellite-changeover will not occur during sending of the information packet; and repeatedly sending of the information packet until completion of the satellite-changeover if it is determined that the satellite-changeover will occur during sending of the information packet.

DETAILED DESCRIPTION OF THE EMBODIMENTS

Hereafter, details of the embodiments according to the present invention will be explained with reference to the drawings.

Figure 1:
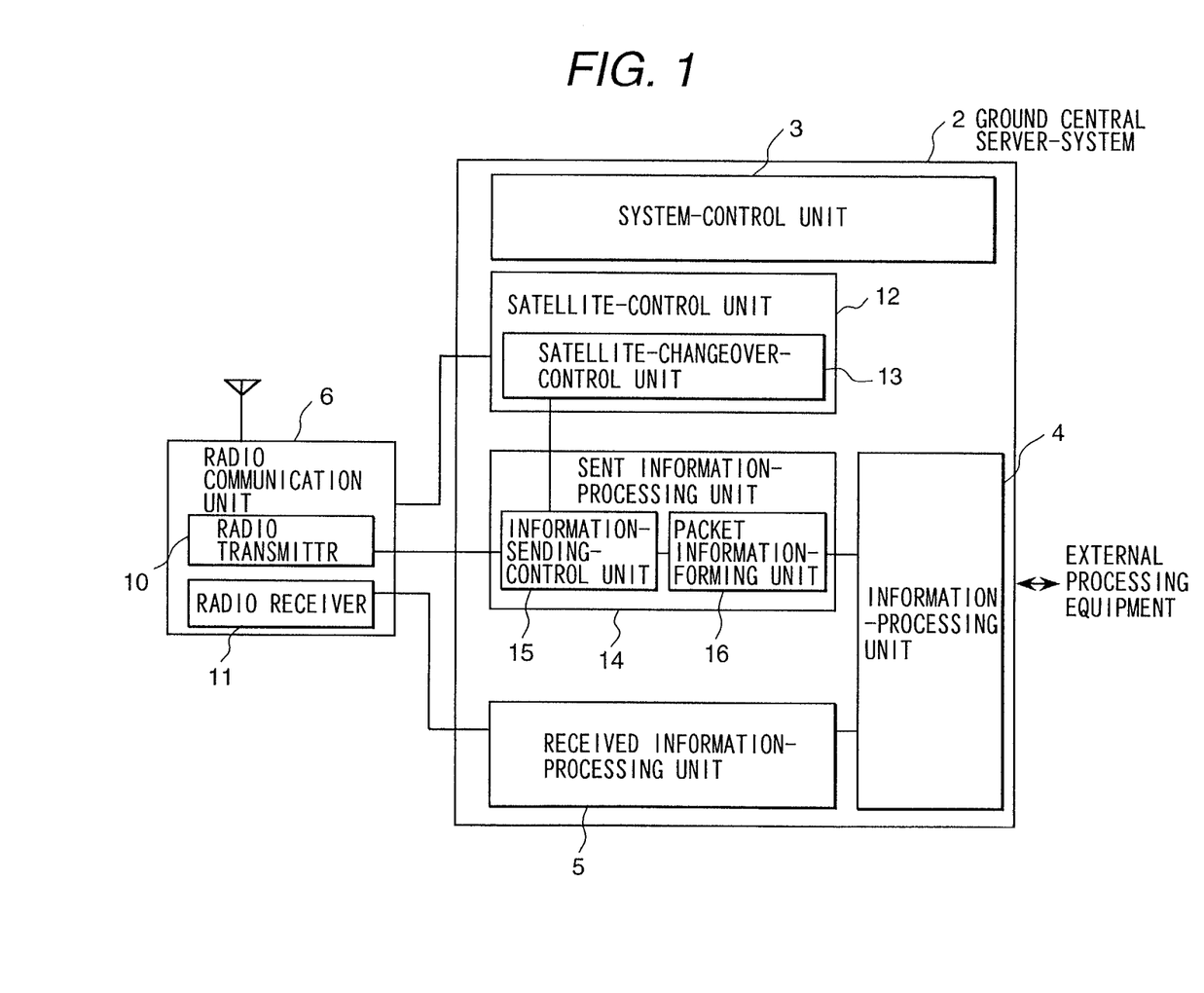
FIG. 1 is a schematic block diagram showing the composition of a server-system in an information-transmission system of an embodiment according to the present invention.

FIG. 1 schematically shows the composition of a server-system in an information-transmission system of an embodiment according to the present invention. Further, FIG. 2 conceptually illustrates the arrangement of non-geosynchronous artificial satellites 101-1, -2, and -3, which are used in the information-transmission system. Furthermore, FIG. 3 conceptually shows various kinds of client apparatuses, which receive services from the information-transmission system.

The relationship between the non-geosynchronous artificial satellite, which is currently selected from among the provided satellites, and the information-transmission system of the present invention situated in the specific area on the earth, is explained below with reference to FIG. 2.

In an information-transmission system, which is provided in the high latitude regions such as Japan, using a geosynchronous artificial satellite launched in midair over the equator, since the elevation angle toward the satellite is small, the radio wave to be communicated between the satellite and the system may be affected by buildings or mountains, and be sometimes shield by them. To relatively stop a satellite at a position in midair over the surface of the earth, it is necessary that the satellite be launched in midair over the equator, and its orbital period be synchronized with the autorotation period of the earth. Accordingly, the large elevation angle cannot be achieved by a geosynchronous artificial satellite, but this can be implemented, for example, by an elliptic orbit-satellite or a figure-eight orbit-satellite. However, these satellites cannot be stopped at a position in the air relative to the surface of the earth. Therefore, it is necessary to arrange a plurality of satellites on proper orbits with the same time interval, and to switch the use of the satellites with appropriate timing.

Figure 2:
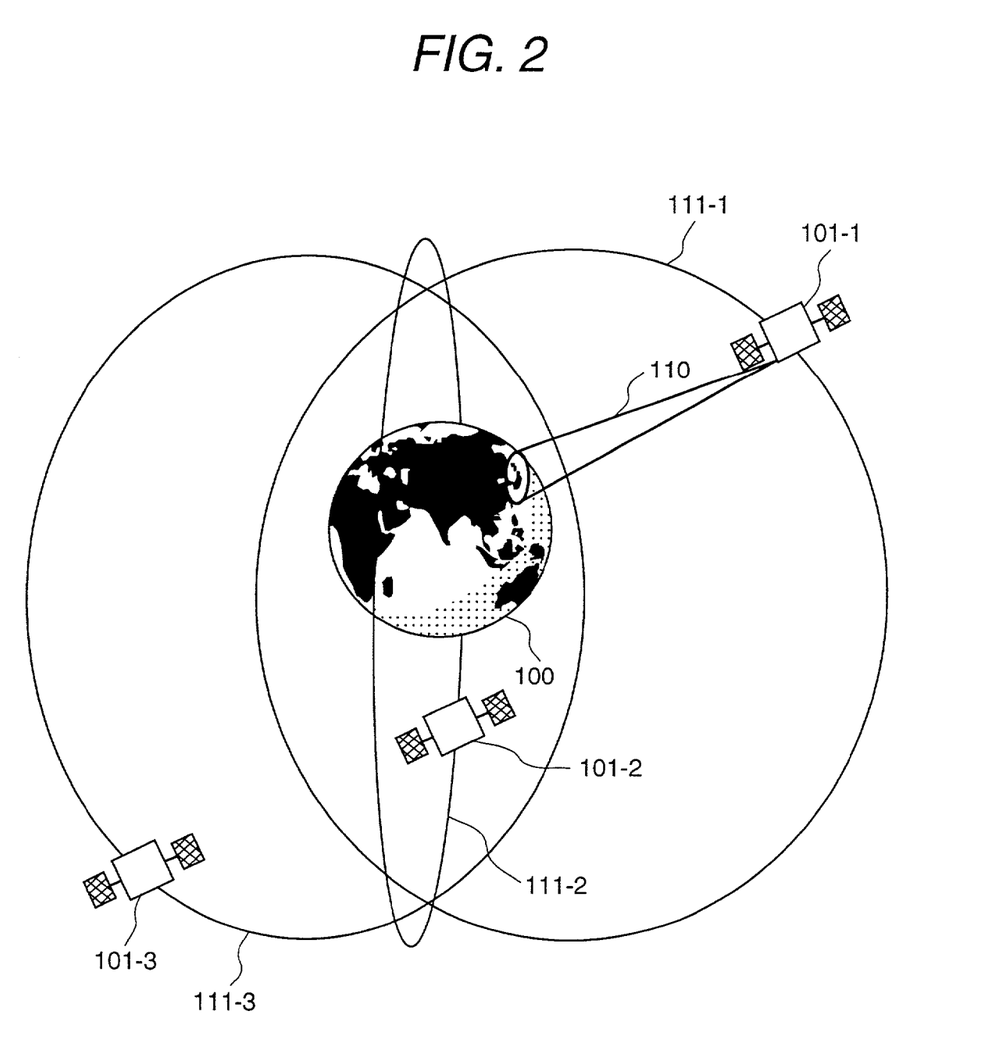
FIG. 2 is an illustration conceptually showing the arrangement of non-geosynchronous artificial satellites, which are used in the information-transmission system according to the present invention.

In the embodiment shown in FIG. 2, three satellites are used, and they are moved so that they alternately keep their elevation angle large in midair over the land of Japan, and communication or broadcast services are rendered via those satellites.

Here, the three satellites 100-1, -2, and -3, which are used for rendering the communication or broadcast services, round on the respective orbits 111-1, -2, and -3. Since those satellites have the same function, they are distinguished by the suffixes. Also, the orbits, on which the respective satellites round, are distinguished by the suffixes.

In FIG. 2, the elevation angle toward the satellite 101-1 is currently largest in midair over the land of Japan among the three satellites, and the services are rendered within the service area 110 via the satellite 101-1. In accordance with the autorotation of the earth, and the movement of each satellite, the elevation angle toward the satellite 101-1 becomes smaller. Next, as the satellite 101-2 approaches in midair over the land of Japan, the elevation angle toward this satellite becomes larger, and its elevation angle becomes the largest among the three satellites. In this way, the satellite whose elevation angle is largest in midair over the land of Japan changes from the satellite 101-1, to the satellite 101-2, and to the satellite 101-3, in order, and this order is repeated. That is, the satellite optimal for the services is periodically changed.

Figure 3:
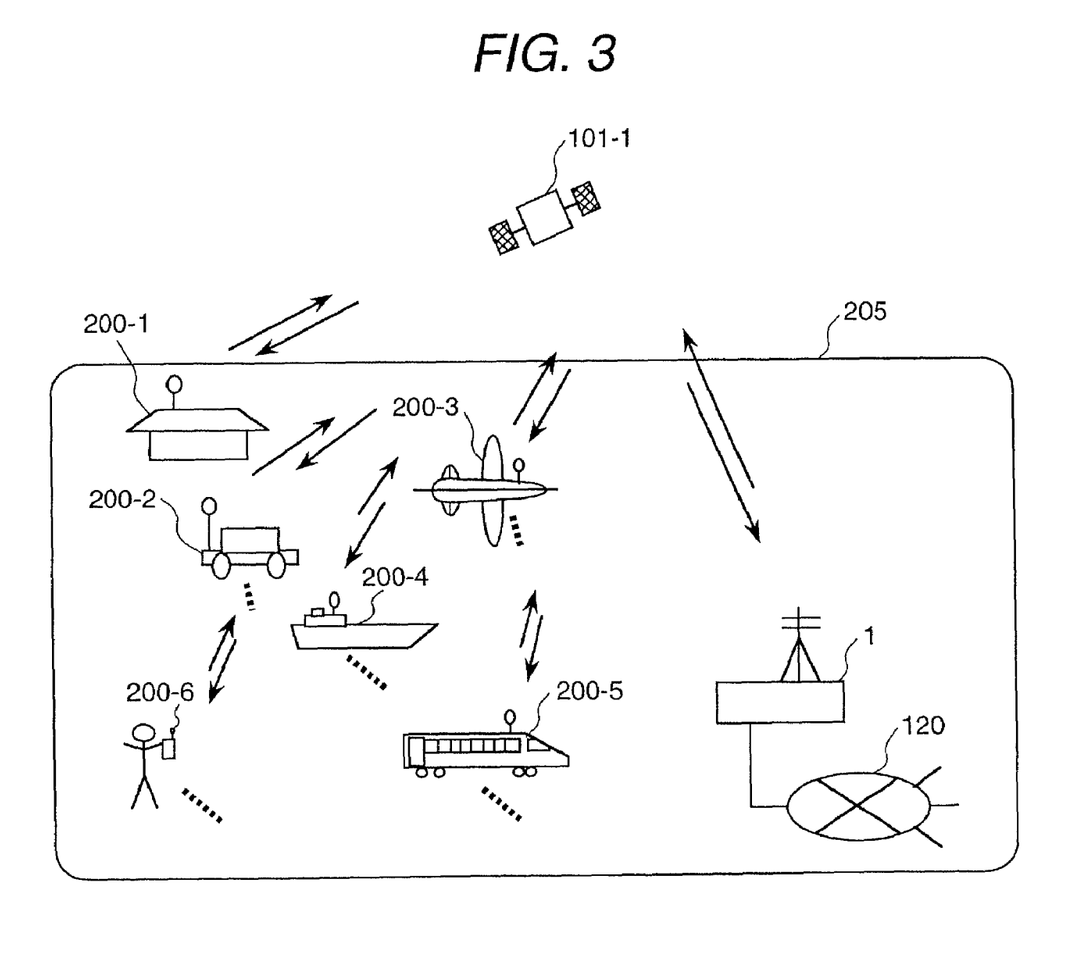
FIG. 3 is an illustration conceptually showing various kinds of client apparatuses, which receive services from the information-transmission system according to the present invention.

FIG. 3 conceptually shows examples of services which are rendered by the information-transmission system according to the present invention. In FIG. 3 as well as in FIG. 2, the satellite 101-1 is used as the satellite which exists at the optimal position. The region surrounded by the frame 205 indicates the area over or on the surface of the earth, in which services can be received from the information-transmission system of the present invention. If broadcast services are implemented, the services are rendered from the central server-center 1 fixed on the earth to its user apparatuses such as subscriber communication apparatuses 200-1. Meanwhile, the mark " . . . " indicates the unspecified users or user apparatuses. Further, if only a receiving device is situated in a user apparatus, the user apparatus can receive the services, independent of whether it is a mobile apparatus or a fixed apparatus.

As shown in FIG. 3, the broadcast services can be received by user apparatuses besides the subscriber communication apparatuses 200-1 in houses. For example, receiving apparatuses situated in cars 200-2, airplanes 200-3, ships 200-4, trains 200-5, etc., can receive the broadcast services. Moreover, the portable communication apparatuses 200-6 such as portable telephones can also receive the broadcast services. These user apparatuses are the mobile communication apparatuses. The situation for the communication services is the same as that for the above-described broadcast services, and if a communication apparatus is situated in each mobile or subscriber apparatus 200-1~n, it can also receive the communication services.

It is more effective for the communication or broadcast services for the mobile apparatuses 200-2~6 shown in FIG. 3 than those for the fixed apparatuses, from the view point of reducing the radio wave-shielding influences due to buildings, mountains, etc., that the elevation angle toward the satellite being used is large. This larger elevation angle of each satellite being used can be obtained by properly arranging the plurality of satellites as shown in FIG. 2. Here, if the changeover of the satellite being used is performed without compatibility with the communication between the satellites and the communication systems on the earth, disturbances occur in the communications or broadcast. Particularly, in the communication of digital information, bit discontinuity in communicated data, or impossibility in data-sending occurs. Further, in communications in which a bit error is not permitted, for example, the transmission of file information between computer systems, the data which are sent in the changeover of the satellites being used are retransmitted after the changeover of the satellites is completed.

In the present invention, the information-retransmission caused by the changeover of the satellite being used is prevented by the central server-system fixed on the earth, with the composition such as that shown in FIG. 1, of the information-transmission system.

A ground central server-system 2 fixed on the earth includes a system-control unit 3, an information-processing unit 4, a received information-processing unit 5, a satellite-control unit 12, and a sent information-processing unit 14 for processing information to be sent. In this composition, the satellite-control unit 12 and the sent information-processing unit 14 are essential features of the present invention. Meanwhile, functions which are not directly related to the present invention, are not shown in this figure.

A satellite-changeover-control unit 13 is included in the satellite-control unit 12, and controls the changing-over of the satellite being, used to the optimal one in order, which is determined based on the current time, and the orbit of each launched satellite. An information-sending-control unit 15 for controlling the sending of information to be sent, situated in the unit 14, takes in the signal relevant to the satellite-changeover, which is sent from the satellite-control unit 12. The information-sending-control unit 15 determines whether or not to transmit the information sent from a packet information-forming unit 16 to a radio communication unit 6.

Figure 4:
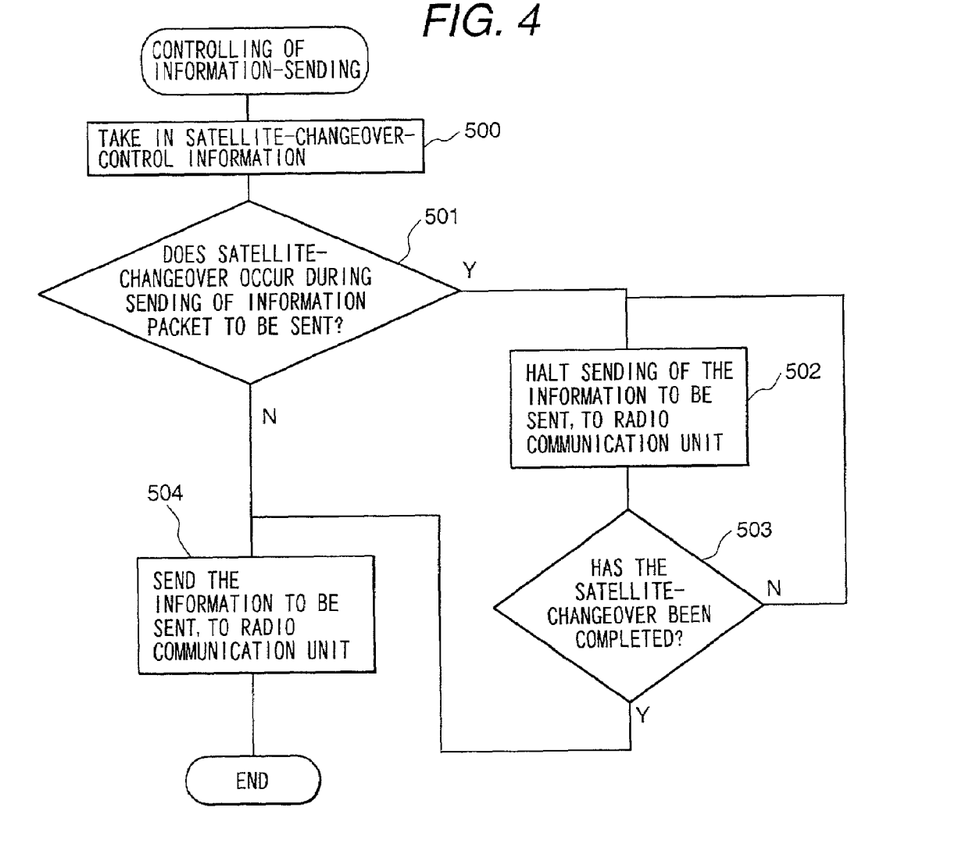
FIG. 4 is a flow chart of the fundamental function of the server-system in the information-transmission system of the embodiment according to the present invention.

The determination of whether or not the information to be sent is output to the radio communication unit 6, which is executed by the information-sending-control unit 15 is carried out in accordance with the flow chart shown in FIG. 4.

At first, in step 500, the data output from the satellite-changeover-control unit 13 is taken into the unit 15. The format of the data is arbitrary only if the start time and the period of the satellite-changeover are clearly indicated. In step 501, it is determined whether or not the satellite-changeover will occur during the sending of the information packet set up in the packet information-forming unit 16. If it is determined in step 501, that the satellite-changeover will not occur, the process goes to step 504 in which this information packet is sent to the radio communication unit 6. Conversely, if it is determined in step 501, that the satellite-changeover will occur, the process goes to step 502 in which the sending of this information packet is stopped. Further, instep 503, it is checked whether or not the satellite-changeover has been completed, and if the satellite-changeover has not been completed, the halt on sending this information packet is continued. On the other hand, if it is determined that the satellite-changeover has been completed, the process of step 504 is performed. The determinations on steps 501 and 502 are implemented by taking; the changeover characteristics of the radio communication equipment being used, the delay time in the processing or communication of information; the time necessary for operations of the radio communication equipment being used, to be stabilized after the occurrence of the satellite-changeover, etc.; into account. The determination processes executed in steps 501 and 502, are typical of essential features of the present invention, which achieve the function of reliably preventing an information packet from being sent, despite it being assumed that the discontinuity or the impossibility of communication may occur during the sending the information packet, since these determinations are carried out by taking the operational conditions or performances of the radio communication equipment being used into account, as described above.

Although the packet information-forming unit 16 is situated in the sent information-sending-control unit 14 for processing information to be sent, in FIG. 1; since the format of information packet can be arbitrary for the information-processing unit 4, or for that matter, the present invention, it is possible to form a packet of information outside the sent information-processing unit 14. Such a composition is not shown in the figures. Further, whether or not an information packet of arbitrary length is accepted, depends on what services are rendered by the present information-transmission system. The present invention is not constrained by the length of an information packet to be sent, apparent from the flow chart shown in FIG. 4. Only whether or not the satellite-changeover will occur during the sending of an information packet to be sent, is the condition for determination of sending the information packet to a radio transmitter 10 in the radio communication unit 6.

Although it is described above that the signal output from the information-sending-control unit 15 is sent to the radio communication unit 6 in FIG. 1, if the present system is used for broadcast only, the output signal of the unit 15 is sent directly to the radio transmitter 10 which is situated in the radio communication unit 6. Also, since the receiving of information is not executed in the system used for broadcast only, there is no radio receiver 11 in the radio communication unit 6.

Thus, in the embodiment shown in FIG. 1, to prevent an information packet, sent from the ground central server-system, from being rejected and discarded by client apparatuses due to its being of incomplete or defective form, the central ground server-system 2 has a function for controlling the radio transmitter 10 so as to postpone the sending of an information packet, whose interruption has been predicted during the next changeover of satellites, at a time just before the satellite-changeover. Further, the central ground server-system 2 has a function for automatically restarting the postponed sending of the information packet, by determining the completion of the changeover. In another way, the server-system has a function in that, if it has been determined based on the preset timing of the satellite changeover, that the interruption of sending an information packet will occur during the next satellite-changeover, this information packet is repeatedly sent after the completion of the changeover, thereby it is estimated that this information will be reliably received by the next satellite being used; and the next information packet to be sent is automatically sent after the completion of the repeated sending of the previous information packet by determining the completion of the changeover.

In further another way, the radio communication 10 situated in the ground central server-system 2 has a similar changeover-determination function for controlling the radio transmitter 10 so as to postpone the sending of an information packet if the interruption of the sending of this information packet is predicted during the next changeover of satellites, and for automatically restarting the postponed sending of the information packet, after the completion of the changeover. Or the radio communication 10 has a changeover-determination function in that, if it is predicted based on the preset timing of the satellite changeover, that the interruption of the sending of an information packet will occur during the next satellite-changeover, this information packet is repeatedly sent until the completion of the changeover, in which time it is estimated that this information will be reliably received by the next satellite being used; and the next information packet to be sent will be sent after the completion of the repeated sending of the previous information packet by determining the completion of the changeover.

In the embodiment shown in FIG. 1, to prevent an information packet, sent from the client apparatuses including mobile apparatuses, from being rejected and discarded by the ground central server-system due to its incomplete or defective form, the ground central server-system 2 includes a means for informing the client apparatuses of the predestinate time or timing of satellite-changeover. Further, each client apparatus has a means for postponing the sending of an information packet, at the time just before the informed time or timing of the satellite-changeover, and for restarting the postponed sending of the information packet, after the predetermined elapsed time. Or each client apparatus has a means for repeatedly sending an information packet, until the completion of the changeover, in which time it is estimated that this information will be reliably received by the next satellite being used, if it is predicted based on the preset timing of satellite changeover, that the interruption of sending this information packet will occur during the next satellite-changeover; and for sending the next information packet, after the completion of the repeated sending of the previous information packet.

Figure 5:
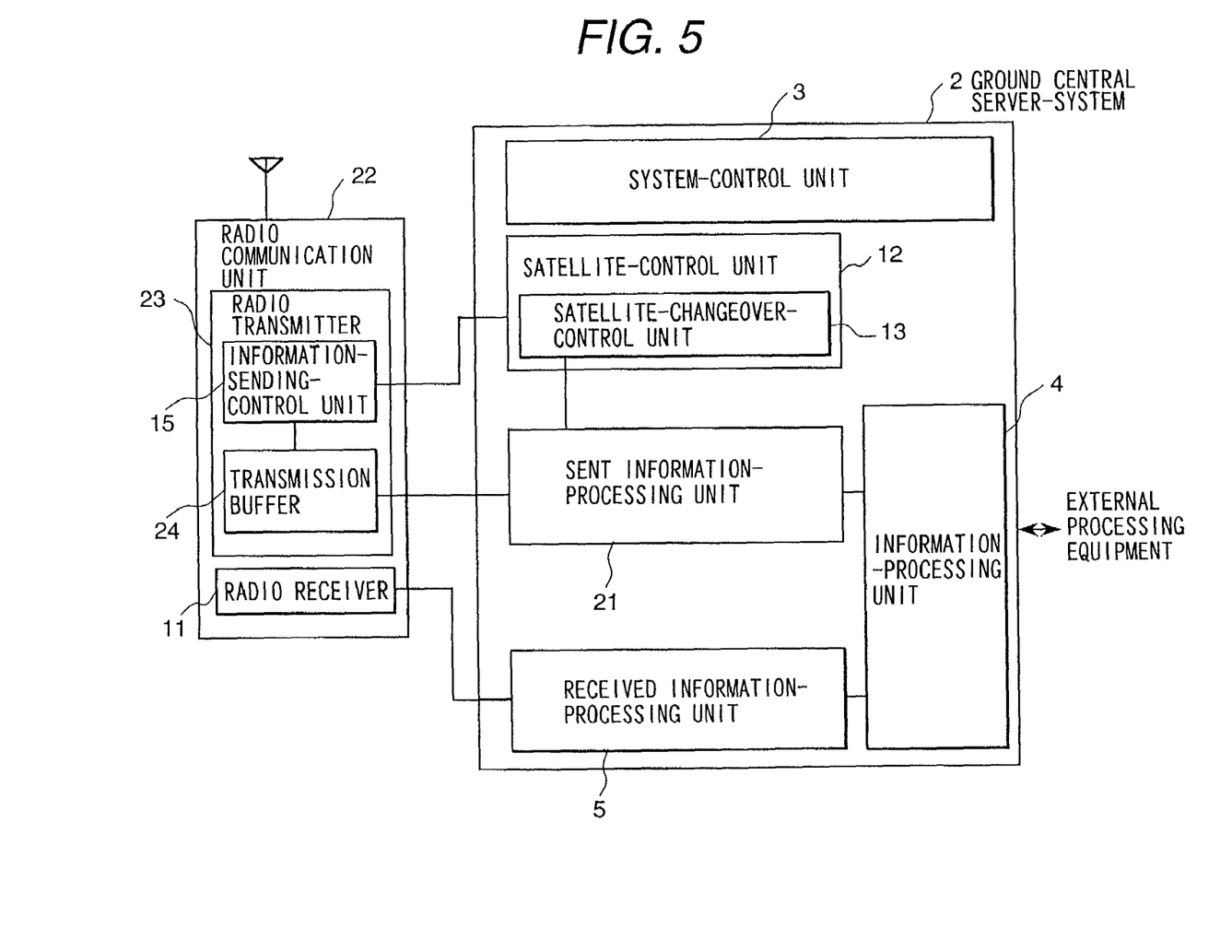
FIG. 5 is a schematic block diagram showing the composition of a server-system in an information-transmission system of another embodiment according to the present invention.

FIG. 5 shows another embodiment aimed at preventing the occurrence of requests to retransmit an information which has been sent, after the completion of the satellite-changeover. Conventionally, if an information packet is transmitted in a period spanning the time of the satellite-changeover, the discontinuity or impossibility in transmission of this information packet occurs, and this results in many requests to retransmit this information packet, which ill-affects the communications after the completion of the changeover.

The composition of the embodiment shown in FIG. 5 is different from the point in that the information-sending-control unit 15 is integrated into the radio transmitter 23. In this figure, reference numbers of the ground central server-system, the sent information-processing unit, the radio communication unit, and the radio transmitter, are changed to 20, 21, 22, and 23, respectively. As seen from FIG. 5 and FIG. 1, the basic function of the ground central server-system 20 is substantially the same as that of the server-system 2 shown in FIG. 1, which achieves the objective of the present invention.

Further, in addition to the information-sending-control unit 15, a transmission buffer is also integrated into the radio transmitter 23 in the radio communication unit 22. The transmission buffer 24 is used to store information packets to be sent, the sending of which is postponed by the information-sending-control unit 15. Although the transmission buffer 24 is located in the radio transmitter 23 in FIG. 5, the place where the transmission buffer 24 is located is optional only if the flow of information packets to be sent, between the radio transmitter 23 and the sent information-processing unit 21, can be controlled. Further, since a transmission buffer is necessary for any general digital communication device, and such a transmission buffer can be used for the above purpose, it is not necessary to situate a specific transmission buffer used exclusively for the information processing during the satellite-changeover.

Furthermore, since the information packet-forming unit 16 does not relate to the features of the present invention as mentioned above, this unit 16 is not shown in FIG. 5. The information packet-forming process just has to be performed before information to be sent is input to the information-sending-control unit 15. Although the radio receiver 11 is situated in the radio communication unit 22, assuming that the present system is a communication type system, the radio receiver 11 is not necessary for a broad type system.

The above embodiments implement mainly the countermeasures to the occurrence of discontinuity in an information packet which is sent from the ground central communication center 1 shown in FIG. 3 to each client apparatus (generally called downlink information-sending) during the period including the time of the satellite-changeover. Since the information-sending from the server-center 1 is independent of the broadcast or communication type information-sending, the above embodiments can be applied to both broadcast type system and communication type system.

In the following, examples of the countermeasure to the occurrence of discontinuity in an information packet, which is sent from each client apparatus to the ground central communication center 1 (generally called uplink information-sending) during the period including the time of the satellite-changeover, will be explained with reference to FIG. 6 and FIG. 7. The ground central server-system 2 or 20 which controls the motion of the satellites, determines the time or timing of the satellite-changeover, and implements the changeover. By using this information of the time or timing of the satellite-changeover, which is output from the satellite-changeover-control unit 13 shown in FIG. 1 or FIG. 5, the central server-system 2 or 20 can send information packets while avoiding the occurrence of the discontinuity in a sent information packet, or the impossibility of sending an information packet to be sent, as a result of the changeover. In the communication type system, although each client apparatus sends information packets, different to the broadcast type system, it is difficult for each client apparatus to precisely measure, or count the timing of the satellite-changeover, without receiving the pertinent information from the server-system 2 or 20 because of its less accurate timer function, or the constraint of its processing ability. Therefore, it is very difficult for each client apparatus to avoid accurately, and to time precisely, the sending of an information packet despite its being predicted that the discontinuity in the sent information packet, or the impossibility of sending the information packet, will be caused by the changeover. Accordingly, in the present invention, the information on the time or timing of the satellite-changeover, which is output from the satellite-changeover-control unit 13 shown in FIG. 1 and FIG. 5, is sent to each client apparatus by affixing this timing information 302 to a client apparatus-control information packet 300.

Figure 6:
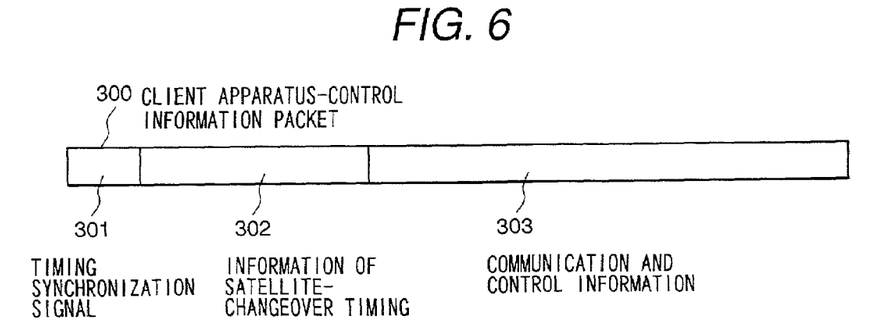
FIG. 6 is an illustration of an example of the data format sent to each client apparatuses which includes the data informing of the changeover timing of satellites.

FIG. 6 shows a general structure of the client apparatus-control information packet 300. Here, the format of a timing synchronization signal 301, and the contents of communication and control information 303 are not restricted to being specific. An essential feature of this embodiment is that the time or timing of the satellite-changeover is sent to all the client apparatuses by integrating this timing information in the client apparatus-control information packet which is sent to each client apparatus.

Figure 7:
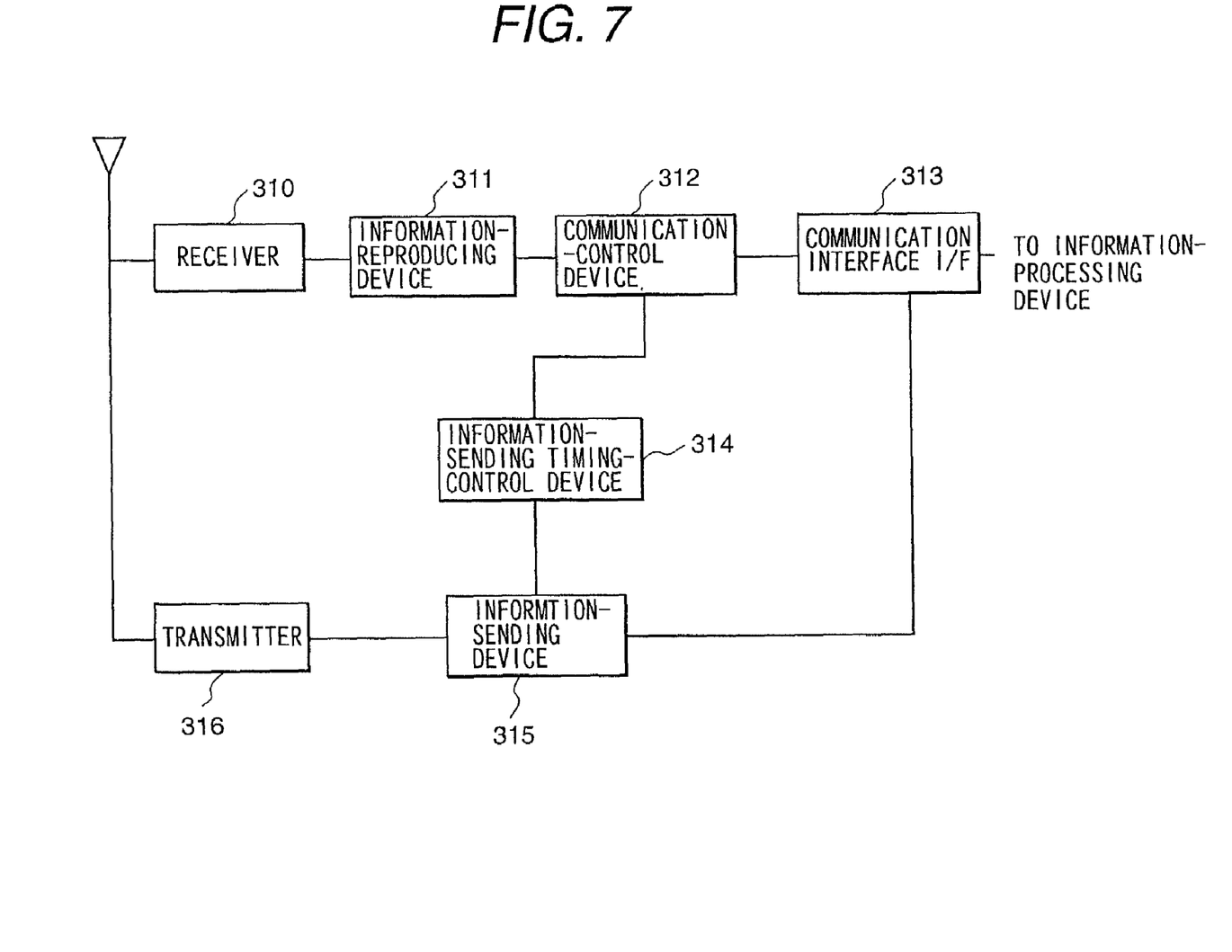
FIG. 7 is a schematic block diagram of the functional composition of the client apparatuses in the information-transmission system according to the present invention.

FIG. 7 shows a schematic block diagram of an example of a communication-processing unit in each client apparatus. Meanwhile, it is assumed that the respective client apparatuses are used in homes 200-1 or mobile apparatus 200-2~6 as shown in FIG. 3. The client apparatus-control information 300 shown in FIG. 6 is decoded, reproduced, and interpreted by a receiver 310, an information-reproducing device 311, and a communication-control device 312, in turn.

If the content of the client apparatus-control information packet 300 is ordinary communication information to be transmitted to the user, this content is sent to a pertinent information-processing device via a communication interface 313. The communication and control information 303 in the client apparatus-control information packet 300, which is not directly related to the present invention, is used in other control devices which are not shown in FIG. 7.

The information 302 about satellite-changeover timing, which is extracted by a communication-control device 312, is sent to an information-sending timing-control device 314. The information 302 about satellite-changeover timing includes the content for precisely informing each client apparatus of the satellite-changeover timing, such as the remaining time until the satellite-changeover, the clock-tuning signal, and the time of satellite-changeover, etc. Further, the information-sending timing-control device 314 controls the sending of a message to a transmitter 316 in an information-sending device 315 based on the received information 302 of satellite-changeover timing. The control method of sending an information packet, which is executed by the information-sending device 315, is the same as that shown in FIG. 4. If an information packet is sent from the information-sending device 315 without controlling the information-sending executed by the device 315, discontinuity may occur in the sent information packet due to the satellite-changeover. Therefore, when the information-sending timing-control device 314 determines that discontinuity or impossibility in information-sending will occur during the sending of an information packet to be sent, due to the satellite-changeover, the sending of the information packet from the information-sending device 315 to the transmitter 316, is stopped by the device 314. Since the sending of the information packet from the information-sending device 315 to the transmitter 316, is stopped, although not shown in FIG. 7, a buffer memory is situated, for example, in the information-sending device 315, in order to temporarily store the information packet whose sending is stopped. Meanwhile, this buffer memory can be located in the communication interface 313, or another memory situated in the communication-processing unit in the client apparatus can also be used as this buffer memory. After the sending of the information packet from the information-sending device 315 to the transmitter 316, is stopped, the information-sending timing-control device 314 permits the device 15 to send the temporarily stored information packet if the device 314 determines that the time for the satellite-changeover has already elapsed.

Although the information-sending method in each of; the ground central server-system 2; and the client apparatus, is separately explained above, it is possible to create the information-transmission system by applying the above information-sending methods to the server-system 2 and to each client apparatus. Further, if the information-transmission system is a broadcast type system, since there is no information-sending function, the information-sending method for client apparatuses is not used for the client apparatuses. However, in the broadcast type system also, if the information of satellite-changeover timing is sent to each client apparatus, the client apparatus can inform its user on the cause of the temporal interruption in broadcast, or warn its user of a temporal interruption in broadcast, by using the timing information. In the communication type system, the respective information-sending methods of the present invention are applied to the server-system 2 and/or to each client apparatus in accordance with the objective of the service system to be created.

Figure 8:
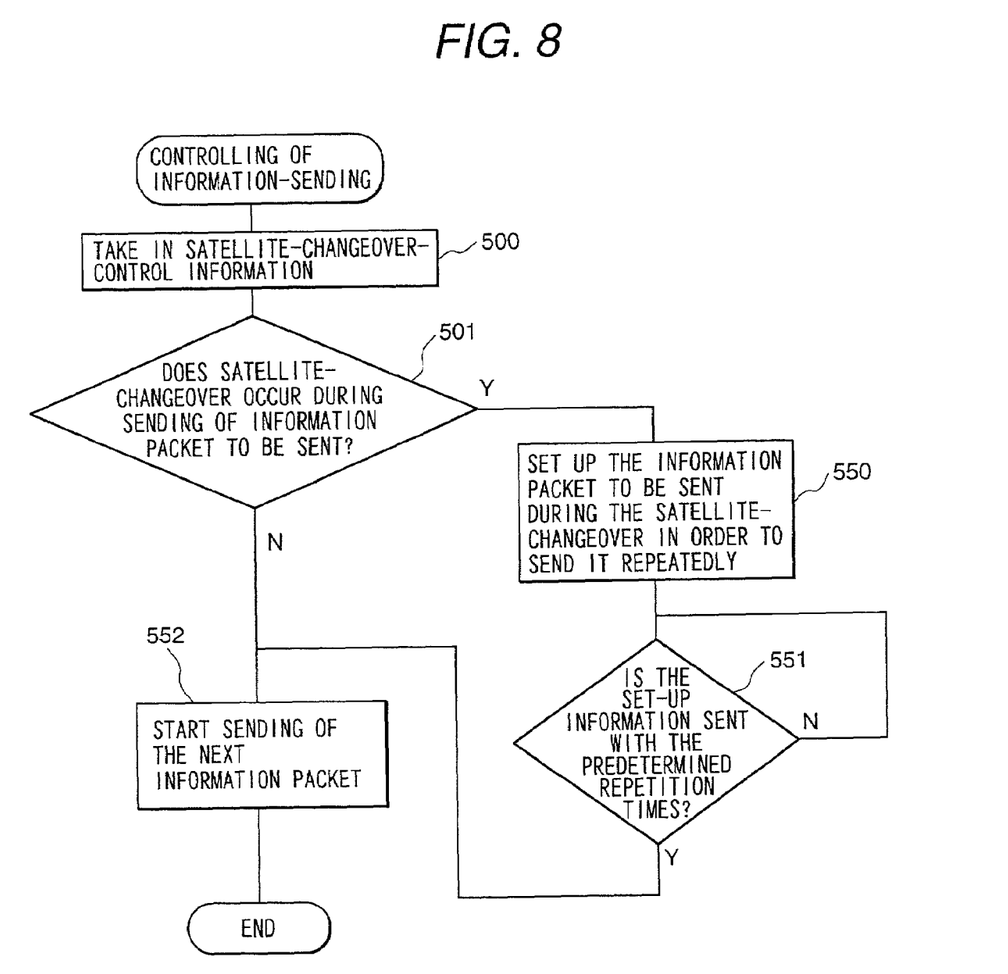
FIG. 8 is a flow chart of the fundamental function of the server-system in the information-transmission system of another embodiment according to the present invention.

Next, another information-sending method of the present invention, which has the same effects as those of the above described information-sending methods, will be explained with reference to FIG. 8. The compositions of the ground central server-system and each client apparatus, which implement this information-sending method, are the same as those shown in FIG. 1, FIG. 5, and FIG. 7. A different point is in the processing flow of control executed by the information-sending-control unit 15 and the information-sending timing-control device 314. That is, it is determined in step 500, whether or not the satellite-changeover will occur during the sending of an information packet to be sent, or the sending of the information packet is in an impossible state due to the satellite-changeover. If it is determined that the satellite-changeover will occur during the sending of the information packet to be sent, or the sending of the information packet is in an impossible state, in step 550, this information packet is registered as the packet to be repeatedly sent. This registered information packet is repeatedly sent until the completion of the satellite-changeover. Further, this repetition number can be appropriately set by taking the period necessary for the changeover and the stabilization in operations of the communication circuit in the changed-over satellite into account. If the repetition number is set to the minimum value which can assure achieving the sending of the information packet to be sent, this repetition number is the most efficient one.

Further, if the period for which the sending of an information packet is not accepted is known, the occurence of futile sending of an information packet can be reduced by adjusting the sending interval. It is favorable that the repetition number and the sending interval are adjusted from the view point of ease in controlling the system and power consumption, etc. In step 551, it is determined whether or not the sending of the information packet is repeated by the repetition number which is determined as described above, and if the repeated sending of the information is completioned, the process goes to step 552 in which the next information packet is sent. By the processing flow shown in FIG. 8 also, since the same information packet is repeatedly sent for long enough to be reliably transmitted to the satellite, based on the time necessary for the satellite-changeover, the continuity of the received information packet can be maintained. Therefore, it is possible to prevent requests for retransmission of the sent information packet due to the sending error caused by the satellite-changeover, from occurring after the completion of the satellite-changeover, aside from a sending error due to natural or other disturbances. Meanwhile, since it may occur that the same information packet is redundantly received, the apparatus which receives the sent information packet needs to have a function for processing the received redundant information packet as the same and only packet, in order to continue the receiving of sent information packets normally. However, this does not directly relate to the present invention.

The functions shown in FIGS. 1, 3, and 7 are easily implemented by software programs or hardware logic circuits. If the means for implementing the present invention are installed in the server-system 2 or the client apparatuses, and particularly a set of respective satellite-changeover times for the whole operating period of the information-transmission, is set to the satellite-control unit 12, the functions according to the present invention can be started automatically, and implemented just as well as timer-started equipment such as an alarm clock, a video recorder, etc.

Figure 9:
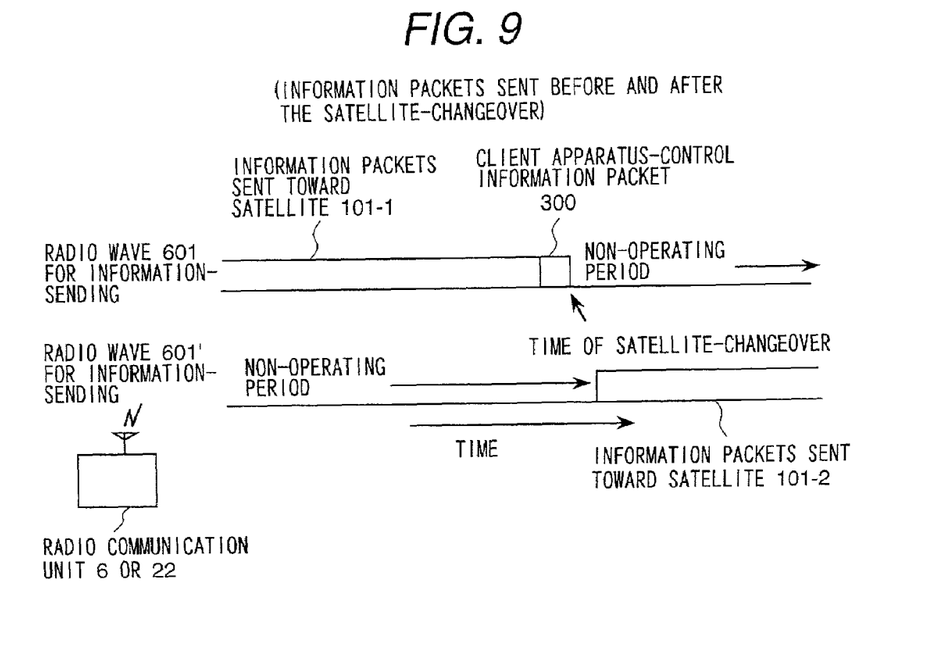
FIG. 9 is an example of messages including an information packet of client apparatus-control information, sent to each client apparatus just before the satellite-changeover.

FIG. 9 illustrates an example of messages including an information packet of client apparatus-control information, sent to each client apparatus just before the satellite-changeover. Here, the sent messages are composed of information packets. This figure shows the case where those messages are sent, for example, when the satellite being used is changed over from the satellite 101-1 to the satellite 101-2. The radio wave 601 is transmitted toward the satellite 101-1 before the satellite-changeover, and the radio wave 601' is transmitted toward the satellite 101-2 after the satellite-changeover. In the usual transmission during which the satellite-changeover is not to occur, the sent messages include service information which is used by the users, and information for monitoring and controlling operations of the satellites. The client apparatus-control information 300 is located in the last packet of the messages sent to the satellite 100-1 as shown in FIG. 9 in order to inform each client apparatus that the satellite-changeover will occur. Although the client apparatus-control information packet 300 is located in the last packet of the messages sent in the radio wave 601, the position at which the packet 300 is located is not restricted to this place. For example, when the packet 300 is located in an intermediate place of the messages sent in the radio wave 601, there is no problem as long as it is correctly transmitted to each client apparatus when the satellite-changeover occurs. As mentioned above, there is no specific restraint to the position where the client apparatus-control information packet 300 is located. However, if the packet 300 is set at the last packet of the sent messages, this can reduce the control load in the client apparatus.

Figure 12:
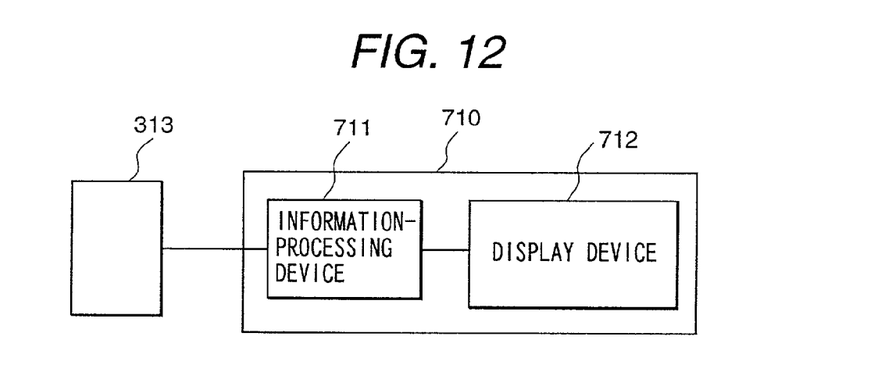
FIG. 12 is a schematic block diagram of the composition of an information-processing unit, situated in each client apparatus, of an embodiment according to the present invention.

Further, as shown in FIG. 12, by providing a display device 712 in an information-processing unit 710 of each client apparatus, information on the satellite-changeover can be indicated to the user. When the client apparatus indicates the information on the satellite-changeover in the information packet 300 to the user, this information is converted to text information if it is indicated by text form, or it is converted to graphic data if it is graphically displayed. Since the above display of information on the satellite-changeover on the client apparatus can be easily processed by a software program executed in a microcomputer, any exclusive processing device is not necessary for that display.

Figure 11:
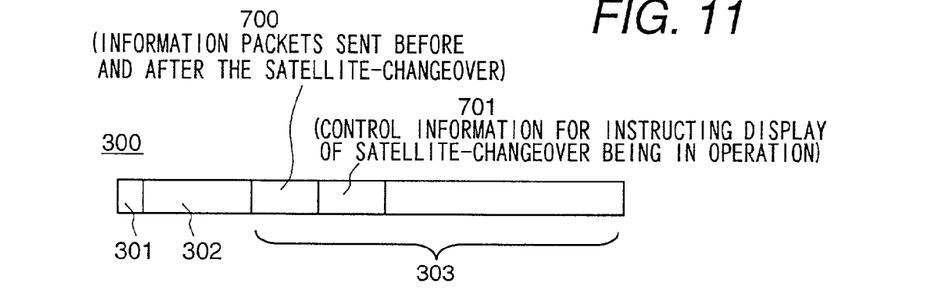
FIG. 11 is an illustration of another example of the data format sent to each client apparatus, which includes the data informing of the changeover timing of satellites.

FIG. 11 illustrates another example of the data format sent to each client apparatus, which includes the data informing of the changeover timing of satellites. In this data format as well as that shown in FIG. 6, the fundamental information of the timing synchronization signal 301 and the information 302 of satellite-changeover timing are also included. Further, it is possible to set up a message 700 for indicating that it is now during the satellite-changeover, or an instruction message 701 for making each client apparatus display "the satellite-changeover currently taking place", to the communication and control information 303. By using the message 700 or 701, it becomes easier to display "the satellite-changeover currently taking place" on the display device 712. Although it is also possible to display "the satellite-changeover currently taking place" by using the timing synchronization signal 301 and the information 302 of satellite-changeover timing, the above data format is effective from the view point of separating message information to be sent to an application program, from control information, and since the implementing of message display by use of this data format can be done by simply changing the software programs, it does not cause any difficulty.

Figure 10:
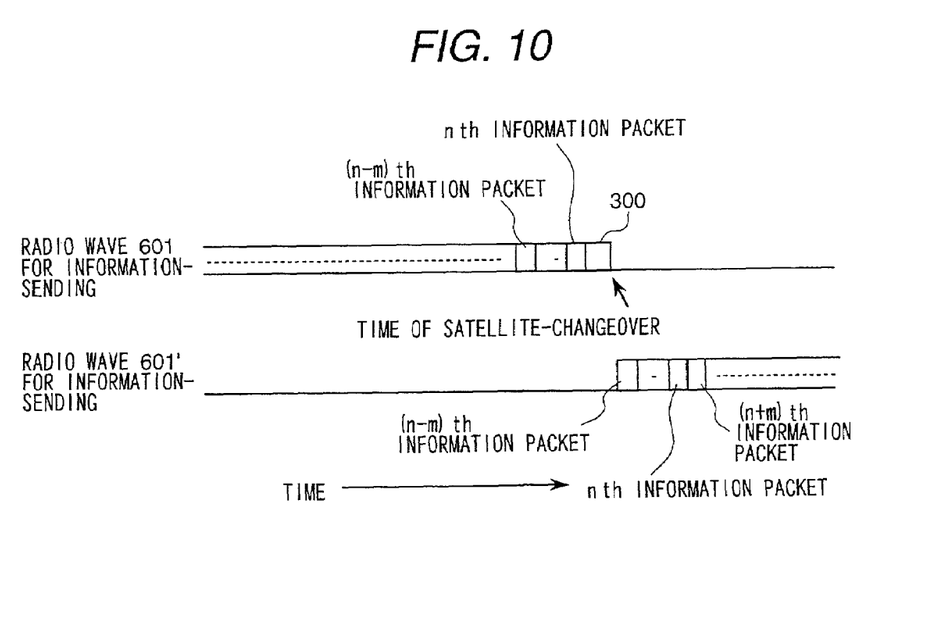
FIG. 10 is an illustration of an example of retransmitting the information packets which were already transmitted before the satellite-changeover.

FIG. 10 illustrates another example of information-transmission during the satellite-changeover, in which a plurality of information packets, which was already transmitted before the satellite-changeover, are retransmitted. In the above description, as a countermeasure to the occurrence of hiatuses in an information packet to be sent in the period including the satellite-changeover, the control method of halting the sending of an information packet or repeating the sending of the same information packet during the satellite-changeover, is devised as shown in the flow charts shown in FIG. 4 or FIG. 8. In the information-transmission shown in FIG. 10, it is intended to improve the reliability of information-sending by the method of halting the sending of an information packet during the period spanning the satellite-changeover, and restarting the sending of the halted information packet. That is, in the case of the information-transmission shown in FIG. 9, just after the satellite-changeover, the halted information packet is sent toward the satellite 101-2 along with the (m+1) items of the information packets already sent toward the satellite 101-1, counted from the information packet last sent before the satellite-changeover. Meanwhile, the example in which the information packet already sent before the satellite-changeover is not sent again, (that is: m=−1), is shown in FIG. 4. In this way, by sending the halted information packet along with the already sent information packets, although the efficiency of using the allocated transmission channel of radio wave is deteriorated, the hiatuses in the information packet to be sent are effectively prevented, and this improves the reliability of information-sending. The appropriate information-sending method to be adopted, is determined by taking the actual conditions of the allocated transmission channel of radio wave into account.

Figure 13:
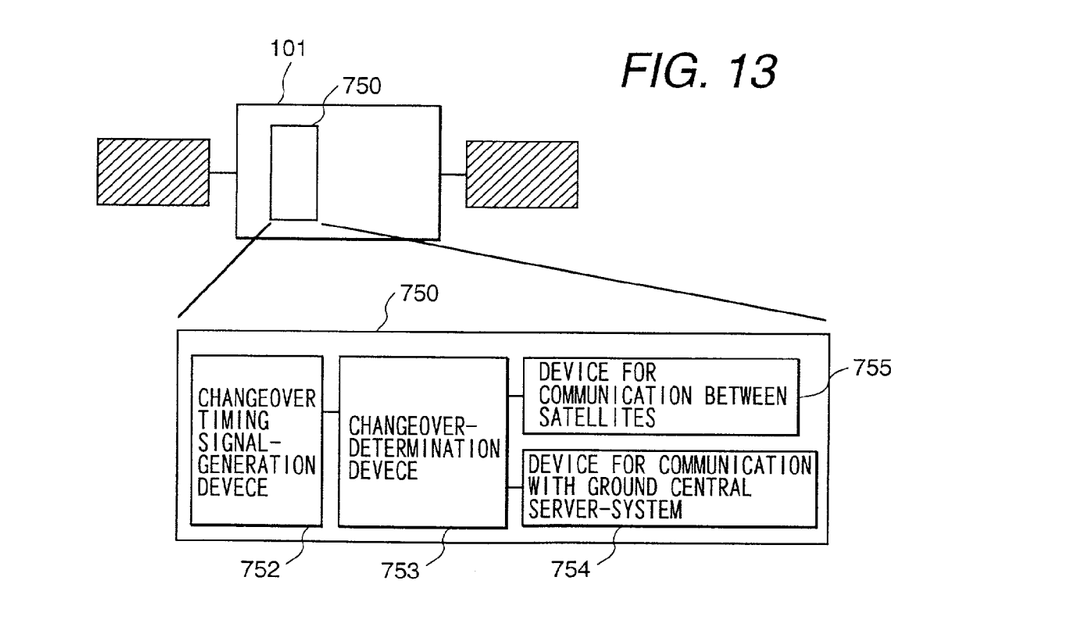
FIG. 13 is a schematic block diagram of the composition of a satellite-changeover-control unit, installed in each satellite, of an embodiment according to the present invention.

FIG. 13 shows a schematic block diagram of the composition of a satellite-changeover-control unit, situated in each satellite, which automatically determines the timing of the satellite-changeover. The orbit of each satellite is predetermined, and the satellite rounds on the predetermined orbit. After each satellite begins to round on its orbit, it is possible to change over the satellite being used at the proper changeover position by measuring time. Therefore, a changeover timing signal-generation device 752 and a changeover-determination device 753 are situated in a satellite-changeover-control unit 750. The changeover timing signal-generation device 752 has a highly accurate timer, and periodically generates a changeover timing signal. The changeover-determination device 753 determines whether or not its own satellite performs the communication, by checking the signal sent from the changeover timing signal-generation device 752. Thus, the satellite-changeover is adequately controlled by the satellites themselves. The result of the processing executed by the changeover-determination device 753 is sent to a device 755 for communication between satellites, according to need, and it is used as the signal for confirming the implementation of the satellite-changeover. If there is one supervisory satellite for controlling the satellite-changeover timing among the satellites, it is possible to compose a satellite system such that the supervisory satellite sends the timing signal to its child satellites, and the child satellites receive and process the timing signal sent from the supervisory satellite. In this way, if at least one satellite has a highly accurate timer, the satellites can control the satellite-changeover by themselves without the changeover-control signal from the ground central communication center.

Further, if it is necessary to send information on the start or end of the satellite-changeover to the ground central communication center, this information on operations of the satellite-changeover is transmitted to the ground central communication center via a device 754 for communication with the ground center. The function of sending the information on the start or end of the satellite-changeover to the ground central communication center, is optional, and if this function is not incorporated into the satellite-changeover-control unit 750, the device 754 for communication with the ground center can be omitted.

Figure 14:
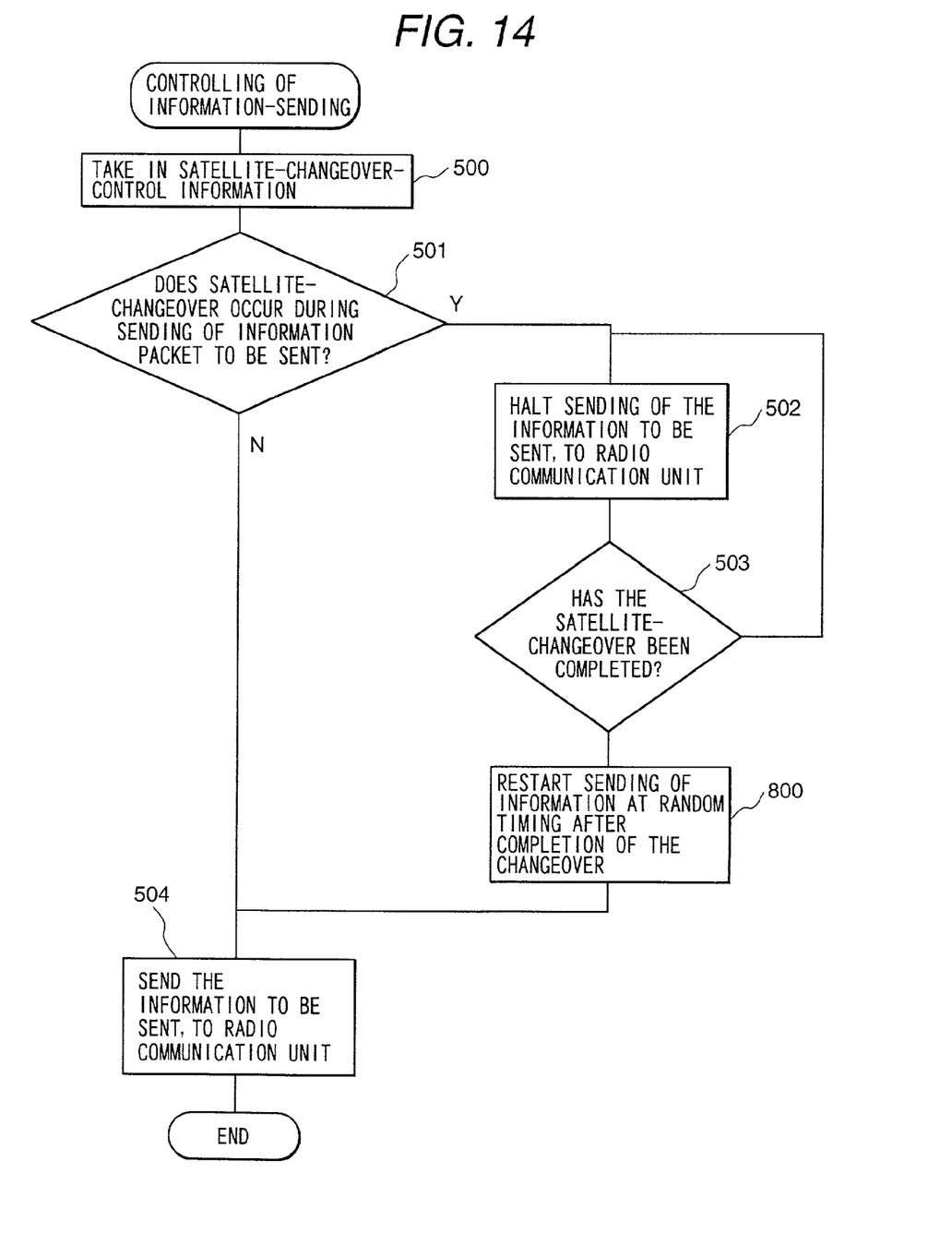
FIG. 14 is a flow chart of another method of transmitting an information packet from client apparatuses after the completion of the satellite-changeover.

FIG. 14 shows a flow chart of another method of transmitting an information packet from client apparatuses after the completion of the satellite-changeover. It is expected that the traffic quantity of transmission from the client apparatuses to the satellite being used increases more largely than usually. That is, it is certainly prospective that the severe congestion occurs in the channel being used, if all the client apparatuses start the transmission of information to the server-system at the same time. In this method, the information-transmissions of the client apparatuses after the completion of the changeover are not started at the same time, but are executed by staggering their start times from each other. Although the flow chart of this method is almost the same as that shown in FIG. 4, step 800, in which the sending of information is started by each client apparatus at random timing after the completion of the changeover, is added to the flow. By the addition of step 800, the start timing of the information-transmission executed by each client apparatus becomes random, which can prevent the communication traffic from concentrating at one time point. It depends on the communication services rendered by this information-transmission system, the communication environment, etc., whether or not the process executed in step 800 is necessary, and the adoption of the step 800 is appropriately determined by taking design constraints of this information-transmission system, such as the objective of the system, the number of the client apparatuses, the communication environment, etc., into account.

According to the present invention, in an information-transmission system which uses non-geosynchronous satellites, each being used, of these satellites, being changed over to another satellite with a predetermined interval, it is prevented that the discontinuity occurs in the information packet sent during the satellite-changeover, which causes requests of retransmitting this information packet. In not preventing a large number of requests for retransmitting a sent information packet from occurring just after the completion of the satellite-changeover, the communication throughput of an information-transmission system is degraded. However, in accordance with the present invention, since it is possible to avoid the occurrence of such requests for retransmitting a sent information, the degradation of the communication throughput can be prevented.

Further, according to the present invention, in an broadcast type information-transmission system which also uses non-geosynchronous satellites, one which is used among these satellites, being changed over to another satellite to be next used, with a predetermined interval, if it is required for this system to send an information packet with error probability as low as possible, the probability of hiatuses occurring in the sent information packet due to erroneous transmission, can be reduced by halting an information packet to be sent, or repeatedly sending this information, during the satellite-changeover.

Furthermore, according to the present invention, in the above broadcast type information-transmission system, since it is possible to inform the users of the satellite-changeover timing, services can be rendered to users without the displeasure caused by the interruption of transmission due to the satellite-changeover.

What is claimed is:

1. An information-transmission system, which uses non-geosynchronous artificial satellites, including a server-system and its client apparatuses, for performing communications or broadcast, said server-system comprising:
a satellite-control unit which controls changeover of a non-geosynchronous artificial satellite being used to another satellite to be next used; and
a sent information-processing unit which determines whether or not satellite-changeover occurs during sending of an information packet to be sent based on the information on the orbit of the satellite, and if it is determined that the satellite-changeover occurs during sending of said information packet to be sent, then postpones sending of said information packet to be sent, and starts sending of said information packet to be sent after completion of said satellite-changeover, wherein said information packet to be sent whose sending has been postponed is sent after said completion of said satellite-changeover, along with the last m items of information packets, which were sent just before said satellite-changeover, where m indicates an integer not less than 0.

2. An information-transmission system, which uses non-geosynchronous artificial satellites, including a server-system and its client apparatuses, for performing communications or broadcast, said server-system comprising a satellite-control unit which controls changeover of satellites for performing the communications based on the information of the orbit of the satellite and the time,
wherein a data area where at least one of the start time, the time needed and the end time of said satellite-changeover is provided to each client with the information packet sent from said server-system to each client,
wherein each client comprises a sent information-processing unit which determines whether or not satellite-changeover occurs during sending of an information packet to be sent based on the information on the orbit of the satellite from said satellite-control unit, and if it is determined that the satellite-changeover occurs during sending of said information packet to be sent, then postpones sending of said information packet to be sent to said server-system, and starts sending of said information packet to be sent to said server-system after completion of said satellite-changeover, and
wherein said sent information-processing unit stores the last m items in the information packet sent just before said satellite-changeover, and sends said information packet to be sent whose sending has been postponed, following the last m items stored, after said completion of said satellite-changeover, where m indicates an integer not less than 0.

3. An information-transmission system according to claim 2,
wherein the start time of sending said information packet to be sent after said completion of said satellite-changeover is set at random, and
wherein each client apparatus displays that the satellite-changeover is in operation on its display device.

4. An information-transmission system which uses non-geosynchronous artificial satellites, including a server-system and its clients apparatuses, for performing communications or broadcast, said server-system comprising:
a satellite-control unit which controls changeover of non-geosynchronous artificial satellite being used to another satellite to be next used; and
a sent information-processing unit which determines whether or not satellite-changeover occurs during sending of an information packet to be sent based on the information on the orbit of the satellite from said satellite-control unit, and sends repeatedly said information packet to said satellite to be next used until completion of said satellite-changeover, if it is determined that the satellite-changeover occurs;
wherein said server-system informs each client apparatus that the satellite-changeover is in operation.

5. An information-transmission system which uses non-geosynchronous artificial satellites, including a server-system and its client apparatuses, for performing communications or broadcast, said server-system comprising a satellite-control unit which controls changeover of satellites for performing the communications based on the information on the orbit of the satellite and the time, wherein said satellite-control unit informs each client of at least one of the start time, the time needed and the end time of said satellite-changeover, and wherein each client apparatus comprises a sent information-processing unit which determines whether or not satellite-changeover occurs during sending of an information packet to be sent based on the information on the orbit of the satellite from said satellite-control unit, and sends repeatedly said information packet to said server-system until completion of said satellite-changeover, if it is determined that the satellite-changeover occurs.

6. An information-transmission system according to claim 5, wherein each client apparatus displays that the satellite-changeover is in operation on its display.

* * * * *